(12) United States Patent
Sterzbach et al.

(10) Patent No.: US 9,858,634 B2
(45) Date of Patent: Jan. 2, 2018

(54) TESTING DEVICE AND A METHOD FOR PROTOCOL TESTING WITH A PLAYING-CARD METAPHOR

(71) Applicant: Rohde & Schwarz GmbH & Co. KG, Munich (DE)

(72) Inventors: Bernhard Sterzbach, Munich (DE); Julius Von Makanec, Munich (DE); Manuel Galozy, Munich (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 279 days.

(21) Appl. No.: 14/406,447

(22) PCT Filed: Jun. 12, 2013

(86) PCT No.: PCT/EP2013/062167
§ 371 (c)(1),
(2) Date: Dec. 8, 2014

(87) PCT Pub. No.: WO2014/009090
PCT Pub. Date: Jan. 16, 2014

(65) Prior Publication Data
US 2015/0154729 A1 Jun. 4, 2015

(30) Foreign Application Priority Data

Jul. 9, 2012 (DE) .................. 10 2012 211 902

(51) Int. Cl.
*G06T 1/20* (2006.01)
*H04L 12/26* (2006.01)
(Continued)

(52) U.S. Cl.
CPC ............... *G06T 1/20* (2013.01); *G06T 11/20* (2013.01); *H04L 43/50* (2013.01); *H04W 24/00* (2013.01); *H04W 24/06* (2013.01); *H04L 43/18* (2013.01)

(58) Field of Classification Search
CPC .......... G06T 1/20; G06T 11/20; H04W 24/00; H04W 24/06; H04L 43/50; H04L 43/18
See application file for complete search history.

(56) References Cited

U.S. PATENT DOCUMENTS 6,724,730 B1 * 4/2004 Mlinarsky ........... H04L 12/2697
370/241
6,758,403 B1 * 7/2004 Keys .................... G06K 7/0008
235/462.45

(Continued)

FOREIGN PATENT DOCUMENTS

CN 101542948 A 9/2009
CN 101690303 A 3/2010
(Continued)

OTHER PUBLICATIONS

The Authoritative Dictionary of IEEE Standards Terms, Seventh Edition, in IEEE Std 100-2000, vol., No., pp.1-1362, Dec. 11, 2000 (only cover/Title page and GUI definition: 3 pages total).*

(Continued)

*Primary Examiner* — Cynthia Britt
(74) *Attorney, Agent, or Firm* — Ditthavong & Steiner, P.C.

(57) ABSTRACT

A testing device serves for the testing of a device under test. It comprises a control unit (12), a display unit and an operating unit. The control unit is embodied to implement a mutual signaling with the device under test, comprising signaling portions. The control unit (12) further contains a card-generating device (23) for generating cards for display by means of the display unit. In this context, the cards each (Continued)

correspond to a given signaling portion. Prompted by a user entry by means of the operating unit, the card-generating device (23) is also embodied to place cards on the display device in a sequence specified by a user and to specify a sequence of the signaling portions of the signaling to be implemented in this manner.

17 Claims, 8 Drawing Sheets

(51) Int. Cl.
*H04W 24/06* (2009.01)
*G06T 11/20* (2006.01)
*H04W 24/00* (2009.01)

(56) References Cited

U.S. PATENT DOCUMENTS

| | | | |
|---|---|---|---|
| 7,356,774 B2* | 4/2008 | Shah | G01R 19/2516 715/744 |
| 7,490,022 B2 | 2/2009 | Sathe et al. | |
| 7,539,489 B1* | 5/2009 | Alexander | H04W 24/06 370/241 |
| 7,735,102 B1* | 6/2010 | Billmaier | G06F 3/0482 345/676 |
| 8,620,305 B2* | 12/2013 | Singh | H04W 24/06 455/422.1 |
| 2002/0138158 A1* | 9/2002 | Landreth | G05B 23/0272 700/21 |
| 2003/0001896 A1* | 1/2003 | Johnson | H04L 43/50 715/771 |
| 2003/0100299 A1* | 5/2003 | Ko | H04L 12/24 455/423 |
| 2005/0120208 A1* | 6/2005 | Albert Dobson | H04L 12/2602 713/160 |
| 2005/0135259 A1* | 6/2005 | Yazdi | H04J 3/14 370/241 |
| 2005/0256662 A1* | 11/2005 | Alder | G01R 19/2516 702/119 |
| 2006/0003810 A1 | 1/2006 | Saikyo et al. | |
| 2006/0085723 A1* | 4/2006 | Bartz | H04Q 3/0029 714/776 |
| 2006/0128373 A1* | 6/2006 | Cochrane | H04M 1/24 455/424 |
| 2006/0197535 A1* | 9/2006 | Ivannikov | H04Q 1/20 324/426 |
| 2007/0033441 A1* | 2/2007 | Sathe | G06F 11/36 714/38.14 |
| 2008/0028338 A1* | 1/2008 | Kodosky | G05B 19/0426 715/835 |
| 2008/0034310 A1* | 2/2008 | Kodosky | G05B 19/0426 715/769 |
| 2010/0120416 A1 | 5/2010 | Huber et al. | |
| 2010/0190451 A1* | 7/2010 | Huber | H04W 24/08 455/67.14 |
| 2010/0197299 A1 | 8/2010 | Huber et al. | |
| 2010/0287036 A1* | 11/2010 | Guinta | G06Q 10/063 705/7.32 |
| 2012/0246515 A1* | 9/2012 | Lusenhop | G06F 11/3672 714/32 |

FOREIGN PATENT DOCUMENTS

| | | |
|---|---|---|
| DE | 102008010288 A1 | 2/2009 |
| DE | 102008010290 A1 | 2/2009 |
| DE | 102008010299 A1 | 3/2009 |
| EP | 1691509 A1 | 8/2006 |
| EP | 1933521 A1 | 6/2008 |
| EP | 2160854 B1 | 11/2010 |
| JP | 2010531588 A | 9/2010 |
| JP | 2010532118 A | 9/2010 |
| JP | 4913243 B2 | 4/2012 |
| JP | 5243538 B2 | 7/2013 |

OTHER PUBLICATIONS

Notification of Transmittal of Translation of the International Preliminary Report on Patentability; International Preliminary Report on Patentability; Written Opinion of the International Searching Authority for corresponding International Application No. PCT/EP2013/02167, dated Jan. 22, 2015, 10 pages.

International Search Report corresponding to PCT/EP2013/062167 dated Sep. 30, 2013, 3 pages.

Anritsu; "RTD (Rapid Test Designer)—LTE Protocol Development Application". Edition MX786201A, Company publication, Mar. 19, 2010, p. 1-12.

Anritsu: "RTD (Rapid Test Designer) A Complete System for Wireless Terminal Behavior Analysis." Edition Jul. 2010, Company publication, Sep. 22, 2010, p. 1-9.

* cited by examiner

TESTING DEVICE AND A METHOD FOR PROTOCOL TESTING WITH A PLAYING-CARD METAPHOR

CROSS-REFERENCE TO RELATED APPLICATION

The present application a national phase application of PCT application No. PCT/EP2013/062167, filed Jun. 12, 2013, and claims priority to German Application No. DE 10 2012 211 902.7, filed on Jul. 9, 2012, the entire contents of which are herein incorporated by reference.

BACKGROUND OF THE INVENTION

Field of the Invention

The invention, according to the various embodiments described herein, relates to a testing device, especially a protocol tester, and a method for protocol testing, preferably of mobile-radio systems.

Discussion of the Background

With the assistance of network simulators, it is possible to emulate signaling sequences between mobile-radio networks and mobile-radio devices. In this context, standardized messages are exchanged between network simulator and mobile-radio device as they would proceed in the real mobile-radio network. The goal here is to give the mobile-radio device manufacturer an opportunity to test the implementation of the protocol standard (for example, LTE-UMTS-GSM) for different layers of the mobile-radio protocol with regard to the terminal device. However, the preparation of such signaling sequences, respectively test scenarios can become very complex and requires special knowledge on the part of the testing personnel. In order to simulate protocol sequences on a protocol tester, test cases from mobile-radio authorities (for example, 3 GPP) are proposed and specified (so-called "conformance test cases"), or the users themselves can implement specially staged scenarios on the device itself. For this purpose, there are traditionally different interfaces and programming languages, however, for all applications, the user requires extensive knowledge regarding the mobile-radio protocol and the respectively used interface.

SUMMARY OF THE INVENTION

Various embodiments of a testing device and a method which allow a reliable and simple preparation of test sequences with only limited, necessary user knowledge are provided herein.

A testing device according to one embodiment of the invention serves for the measurement of a device under test. It may include a control unit, a display unit and an operating unit. The control unit may be embodied to implement mutual signaling, may include signaling portions, with the device under test. The control unit further contains a card-generating device for generating cards for display by means of the display unit. In this context, the cards each correspond to a given signaling portion.

Prompted by a user entry by means of the operating unit, according to another embodiment, the card-generating device is preferably embodied to place cards on the display unit in a sequence specified by a user, and, in this manner, to specify a sequence of the signaling portions of the signaling to be implemented. Accordingly, without extensive knowledge regarding a protocol used and regarding the programming of test scenarios, a user can specify a signaling sequence.

In yet another embodiment, the card-generating device is further embodied to display cards in such a manner on the display unit that permitted linking possibilities of the cards are marked. Permitted linking possibilities of the cards may be marked by particular preference by means of colored areas and/or shaded areas and/or symbols. By preference, the permitted linking possibilities of the cards correspond to permitted signaling sequences within a communications protocol. Accordingly, a further reduction of the necessary knowledge regarding the protocol used can be achieved.

In another embodiment, the control unit preferably further contains a checking device, which is embodied to check whether linkings of cards specified by the user which correspond to sequences of signaling portions are permitted according to the communications protocol, and to display this by means of the display unit. Accordingly, a further reduction of the requirements on the user is possible.

The control unit preferably further contains a card-modification device, which, prompted by a user entry by means of the operating unit, may be embodied to modify the signaling portions of the cards. In this manner, a great flexibility of the adjustable signaling sequences is possible.

In one embodiment, the control unit preferably further provides a status-monitoring device, which may be embodied to monitor and display on the display unit a planned protocol status of the device under test during a specification of the linking of the cards, and/or to monitor and display on the display unit a protocol status of the device under test during an implementation of measurements. In this manner, an additional reduction of the requirements on the knowledge of the user is achieved.

In another embodiment, the control unit preferably further provides a transition device, which may be embodied, in the case of the selection of a given protocol status, to display by means of the display device cards which correspond to signaling portions which transfer the device under test from the protocol status present within the signaling to be implemented into the given protocol status. The transition device is preferably embodied to display by means of the display unit individual cards which correspond to signaling portions which transfer the device under test from the present protocol status directly to the given protocol status when a direct transfer is permitted according to the communications protocol, and to display by means of the display unit series of cards which correspond to signaling portions which transfer the device under test from the present protocol status via at least one intermediate status to the given protocol status when a direct transfer is not permitted according to the communications protocol. In this manner, the user can program the used protocol completely without knowledge regarding permitted signaling sequences.

A method according to one embodiment serves for the testing of a device under test. A mutual signaling comprising signaling portions may be implemented with the device under test. Cards may be generated for the display. In this context, the cards each correspond to a given signaling portion. Prompted by a user entry, cards may be placed in a sequence specified by a user. In this manner, a sequence of the signaling portions of the signaling to be implemented may be specified. Accordingly, a user can specify a signaling sequence without extensive knowledge regarding the protocol used and regarding the programming of test scenarios.

BRIEF DESCRIPTION OF THE DRAWINGS

In the following, the invention is described by way of example with reference to the drawings in which an advantageous exemplary embodiment of the invention is presented. The drawings show.

Figure 1:
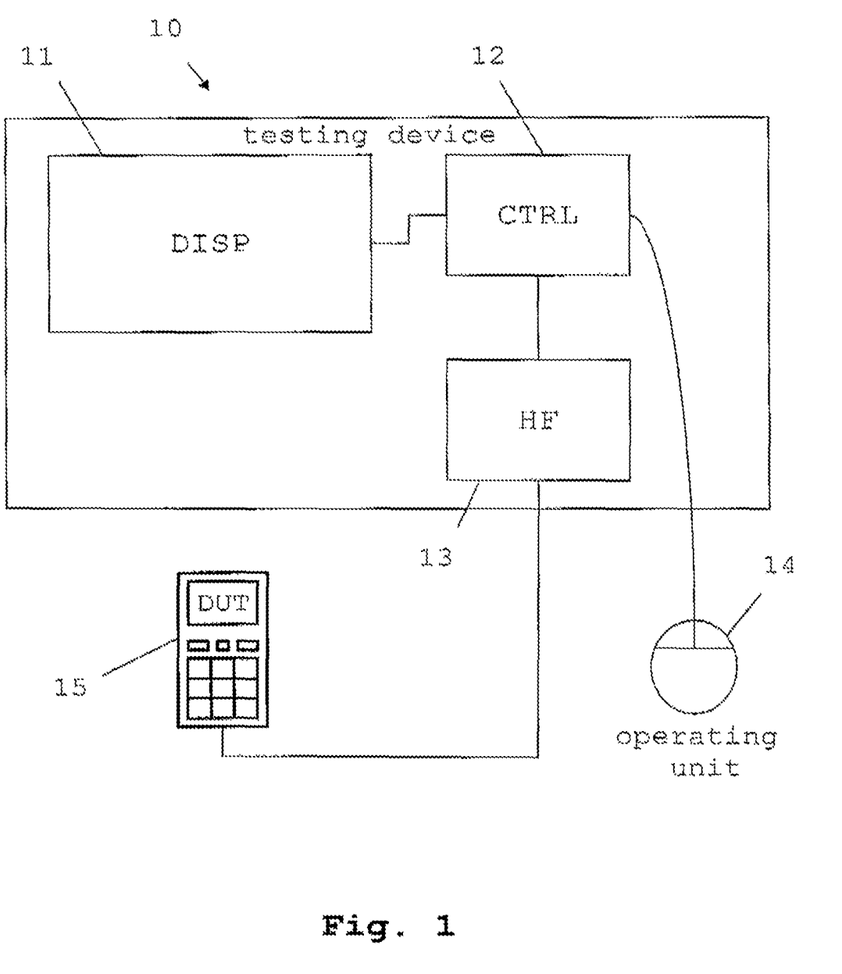
FIG. 1 an embodiment of the testing device in an overview presentation.
Figure 2:
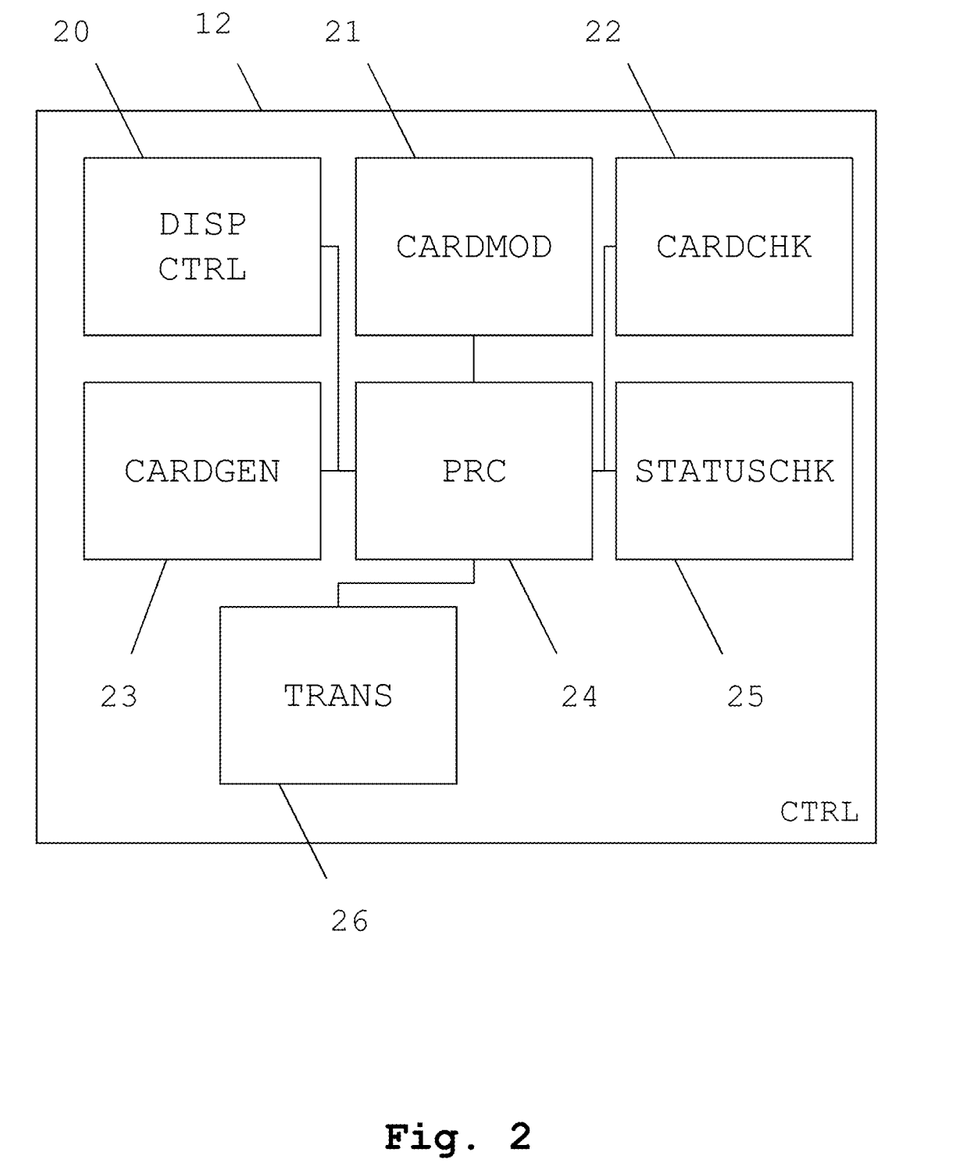
FIG. 2 an embodiment of the testing device in a detail view.

Initially, with reference to FIG. 1, the general construction and the general functioning of an embodiment of the testing device will be visualised. With reference to FIG. 2, the precise construction of the embodiment of the device will then be described. Following this, the functioning of an embodiment of the testing device and the method will be shown in detail with reference to FIGS. 3-5. The functioning of various embodiments of the method will then be further described with reference to FIGS. 7-9. The presentation and description of identical elements in similar drawings have not been repeated in some cases.

FIG. 1 shows an embodiment of the testing device 10. In this context, the testing device 10 contains a display unit 11, a control unit 12, a high-frequency unit 13 and an operating unit 14. A device under test 15—here, a mobile-radio device—is connected to the testing device 10. The display unit 11 is accordingly connected to the control unit 12. The high-frequency unit 13 here is also connected to the control unit 12. Furthermore, the operating unit 14 is also connected to the control unit 12. The device under test 15 is connected to the high-frequency unit 13.

By means of the operating unit 14, the user prepares signaling sequences, which are recorded by the control unit 12 and displayed on the display unit 11. For this purpose, with the assistance of the operating unit 14, the user places cards which correspond to the signaling portions on the display unit 11 and specifies their sequence in this manner. In this context, the signaling can be directed uni-directionally from the testing device 10 to the device under test 15 or from the device under test 15 to the testing device 10. Alternatively, bi-directional signaling is also possible.

As soon as the signaling has been specified, the user can cause it to be implemented as a measurement by selecting with the operating unit 14. In this context, the results of the measurement are again recorded by the testing device 10. In this context, the precise procedure of specifying the signaling will be described with reference to FIGS. 3-9.

FIG. 2 shows a detail view of the embodiment of the testing device from FIG. 1. Only the control unit 12 from FIG. 1 is shown here. In this context, the control unit 12 contains a processing device 24, which is connected to a display-control device 20, a card-modification device 21, a checking device 22, a card-generating device 23, a status-monitoring device 25 and a transition device 26. All of the components of the control unit 12 from FIG. 1 can therefore be realized by a multifunctional processor.

Accordingly, the processing device 24 controls the functions of the other devices 20, 21, 22, 23, 25 and 26. In this context, the display-control device 20 serves for the control of the display unit 11 from FIG. 1. The card-generating device 23 here serves for the generation of cards for display on the display unit 11. In this context, a card corresponds to a given signaling portion. Only a single message or a sequence of messages may be involved here. It is also conceivable that an individual card represents several signaling sequences, which are linked to operations. Cards may also contain only instructions to the user, which she/he must follow in the course of the measurement, for example, to set the device under test into given statuses.

In this context, the card-generating device 23 additionally shows on each card how the latter can be linked with other cards. This will be described in greater detail with reference to FIGS. 3-6c.

The card-modification device 21 serves for the modification of the signaling portion which corresponds to a card. After the card to be modified has been selected by the user by means of the operating unit 14 from FIG. 1, the respective signaling portion is displayed on the display unit 11 by the display-control device 20. In this context, every individual message to be transmitted is displayed. Through selection of individual messages by means of the operating device, the user can vary the content of the messages. Similarly, by shifting the messages, she/he can manipulate their sequence. Deletion or addition of messages is also conceivable here.

The checking device 22 serves for checking whether linkings of cards specified by the user, which correspond to sequences of signaling portions, are permitted according to a communications protocol used. If a permitted linking is determined, this is displayed by means of the display-control device 20 on the display unit 11. A non-permitted linking is also displayed highlighted on the display unit 11.

The status-monitoring device 25 serves here for the monitoring of the respective status of the device under test 15 from FIG. 1 during the implementation of a measurement, respectively the monitoring of a planned protocol status of the device under test during the preparation of a signaling procedure. For this purpose, the status-monitoring device provides knowledge regarding the protocol used. All possible protocol statuses can be registered by the status-monitoring device. During a measurement, the status-monitoring device therefore permanently monitors the protocol status of the device under test 15. During the preparation of a signaling by fitting together cards which correspond to the individual signaling portions, the status-monitoring device 25 always displays the protocol status of the device under test at the respective moment of the planned signaling sequence on the display unit 11 by means of the display-control device 20.

In particular, in the case of the selection of a card from an already specified signaling sequence, the status-monitoring device 25 determines the planned status of the device under test 15 at this moment of the signaling and accordingly displays the protocol status on the display unit 11.

Furthermore, the transition device 26 serves for determining possible signaling sequences in order to move from a present protocol status of the device under test respectively a present planned protocol status of the device under test at a given time during the signaling sequence to a desired protocol status of the device under test. For this purpose, the transition device 26 also comprises knowledge regarding the protocol used. As soon as the desired protocol status is selected by the user by means of the operating unit 14, the transition device 26 determines the cards, which correspond to signaling portions, by means of which this desired protocol status can be reached. If the desired protocol status can be reached by means of a direct status transition, the transition device 26 displays only cards which allow this direct status transition. However, if the desired protocol status can be reached only via intermediate statuses, the transition device 26 displays series of cards by means of which the desired protocol status can be reached.

Figure 3:
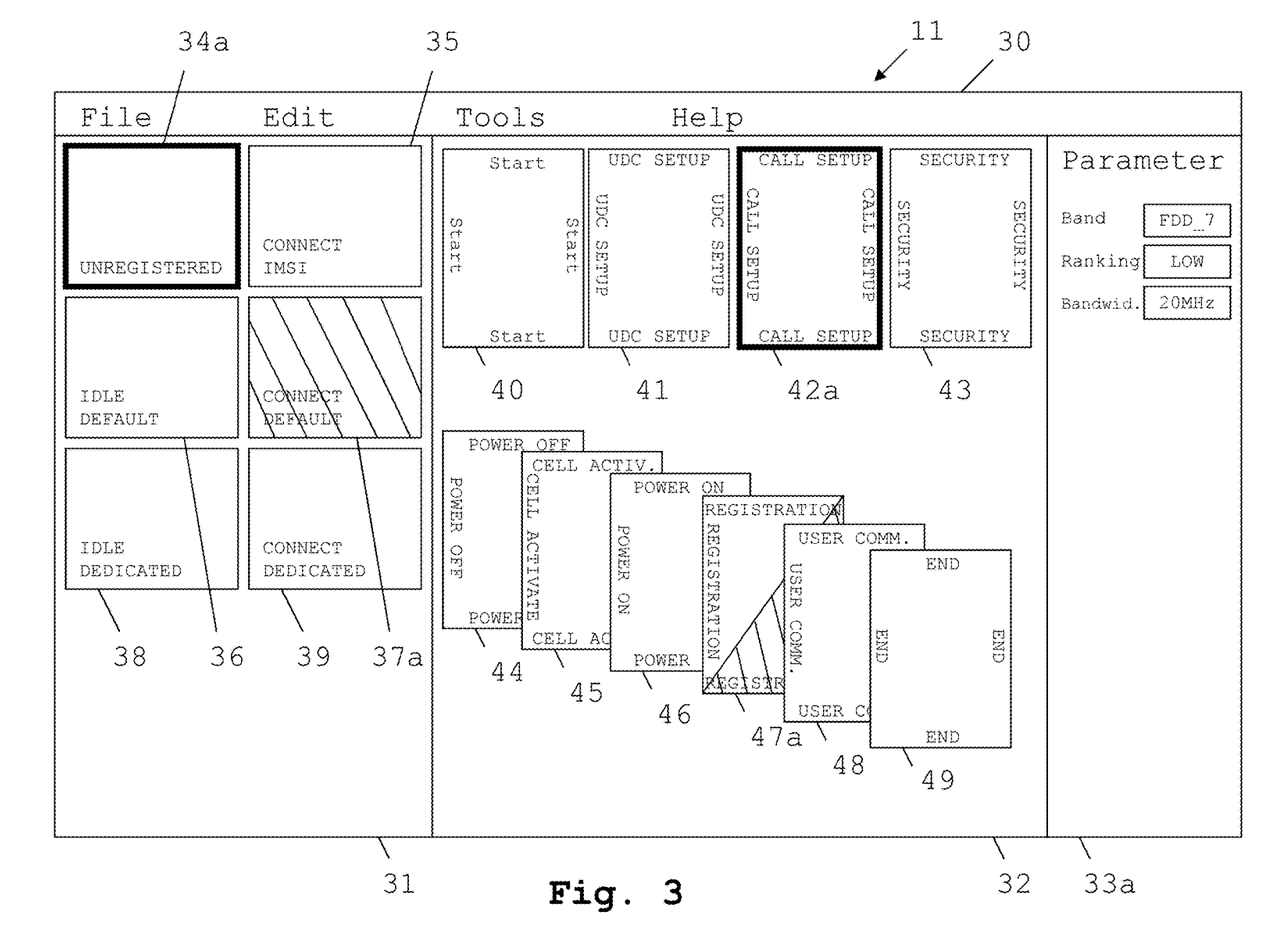
FIG. 3 a first view of the display unit of the embodiment of the testing device.
Figure 4:
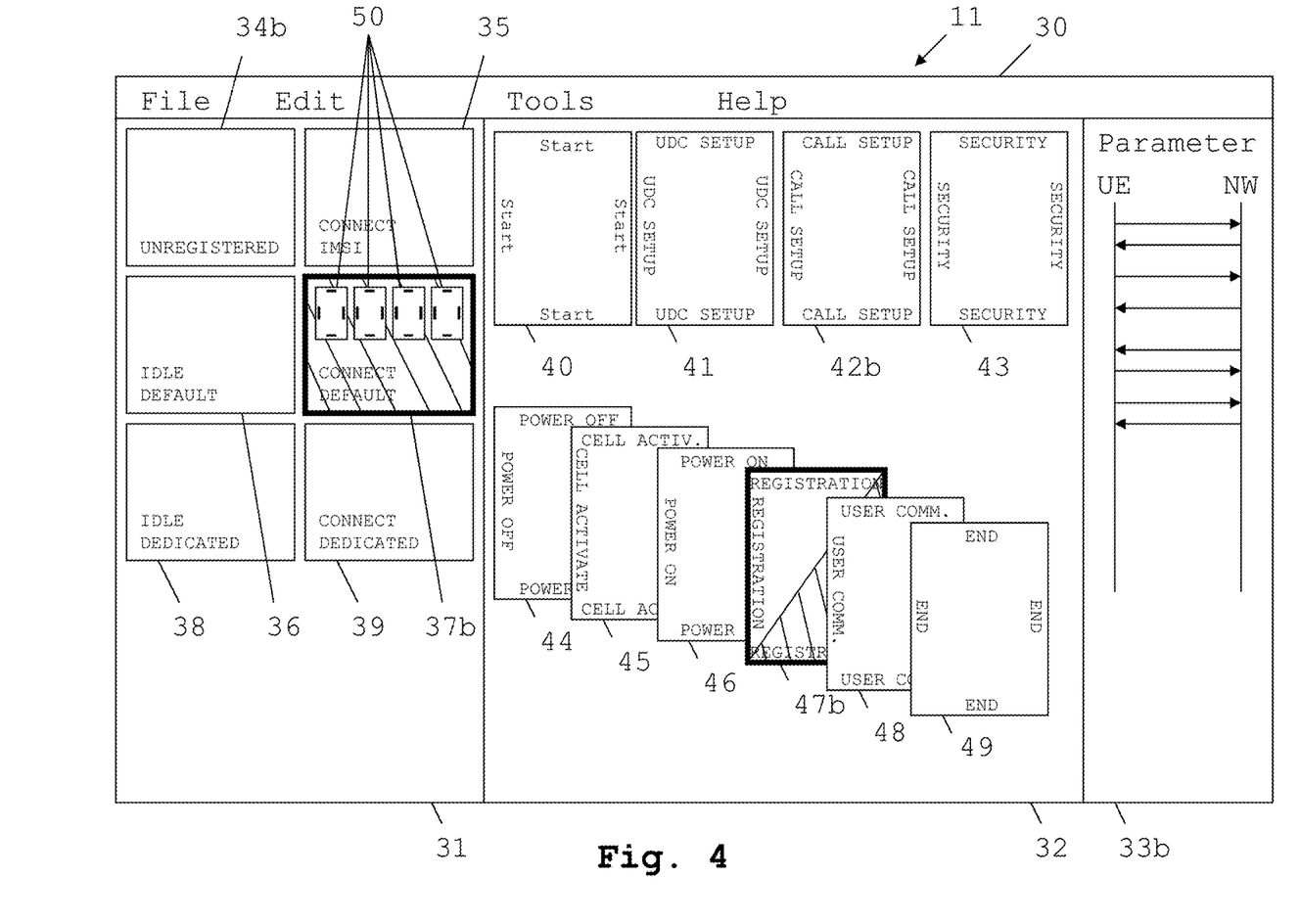
FIG. 4 a second view of the display unit of the embodiment of the testing device.

FIG. 3 shows a first view of the display unit 11 from FIG. 1 during the operation of the test device 10. A menu bar 30 shows several buttons for the implementation of settings by means of the operating unit 14 from FIG. 1. The button "File" in this context serves for the saving and opening of signaling sequences. In particular, already pre-prepared signaling sequences can be supplied with the testing device. The button "Edit" serves for the selection of different processing statuses. For example, it is possible to switch between the operating status illustrated in FIG. 5, which allows a selection from all available cards, and the processing of individual cards as illustrated in FIG. 3 or 4. The button "Tools" in turn allows the selection of different processing tools. For example, a distinction could be made between a selection tool and a deletion tool. The button "Help" allows instruction texts to be opened.

A first window 31 displays different protocol statuses 34*a*, 35, 36, 37*a*, 38, 39 within the protocol used. In a second window 32, a signaling is displayed through a sequence of cards 40, 41, 42*a*, 43, 44, 45, 46, 47*a*, 48 and 49. The course of the signaling in this context takes place from top left to bottom right. In a third window 33*a*, parameters of a card 42*a* just selected are displayed.

In this context, the cards 40-49 are each marked with a name. Here, the lettering is provided at all four sides, so that, even if the cards are covered as shown in the case of cards 44-49, it is still recognizable which card is involved. In this context, the names are decisive for the function of the card in the signaling sequence. A display of symbols for displaying the content of the card is also conceivable.

In this context, the cards 40-49 can be additionally displayed in color or in grey scales or with shading, in order to display linking possibilities between the cards. Accordingly, for example, the card 47*a* is displayed divided in two. The upper left part provides no hatching, while the lower right part provides a hatching. If a card 40-49 provides no hatching here, this means that it can be placed in any arbitrary sequence, that is, after any arbitrary card and before any arbitrary card, and accordingly, is not bound to a given protocol status 34*a*, 39. However, if a card 40-49 provides a hatching at one side, this means that, in the direction of this side, it can be connected only with a further card with identical hatching or without hatching. The card 47*a* can therefore be placed in the sequence after any arbitrary card. However, only cards which provide an identical hatching or provide no hatching can be placed after the card 47*a*.

The hatching shown from the bottom right part of the card 47*a* is shown again in the first window 31 in the protocol status 37*a*. This indicates that the card 47*a* transfers the device under test from an arbitrary protocol status into the protocol status 37*a*. In the view shown here, the card 42*a* has been selected by the user. This is indicated through highlighted display of the card 42*a*. After selection of this card 42*a*, the control unit 12 from FIG. 1, expressed more precisely, the status-monitoring device 25, determines the protocol status 34*a*-39 into which the card 42*a* moves the device under test. In this case, the device under test remains in the status 34*a*.

In this context, the protocol status 34*a* corresponds to a mobile-radio device not registered in the mobile-radio network. The protocol status 35 corresponds to a connection take-up on ISMI basis. Accordingly, the protocol status 36 corresponds to a waiting status without dedicated connection. The protocol status 37*a* here corresponds to an active connection between the mobile-radio device and the network. In this context, the protocol status 38 corresponds to a waiting status but with a dedicated connection. The protocol status 39 here corresponds to an active connection with dedicated connection.

In this context, the cards 40-43 form a signaling preamble. This is required for the connection setup. Accordingly, the card 40 corresponds to the start of the signaling. The card 41 contains the messages necessary for setting up a UDC connection. The card 42*a* here contains the messages necessary for setting up a connection. In this context, the card 43 serves for the exchange of security messages. The card 44 instructs the user to deactivate the device under test. The card 45 activates an emulated base station and puts it into a ready status. The card 46 instructs the user to activate the device under test. The card 47*a* contains the signaling for setting up the registration of the device under test in the emulated base station. The card 48 instructs the user to activate given entries in the device under test. The card 48 terminates the measurement procedure.

FIG. 4 shows a second display of the display unit 11 of the embodiment of the testing device. Here, the card 47*b* has been selected by the user. This is indicated by the highlighted display of the card 47*b*. Following this, a selection of the protocol status 37*b* was made. This means that the transition device 26 from FIG. 2 displays all possible cards 50, which lead to the achievement of the protocol status 37*b*, starting from the present protocol status 37*b* of the device under test. As already illustrated with reference to FIG. 3, the card 47*b* has already transferred the device under test into the protocol status 37*b*. That is, the cards 50 which transfer the device under test into the protocol status 37*b* lead only to the retention of the protocol status 37*b*. In this context, the cards 50 are displayed considerably minimized in the first window 31 within the protocol status 37*b*. Here, it is particularly evident that the lettering on the cards 50 is not reliably legible. In order to overcome this problem, easily recognisable symbols which display the content of the respective card can be additionally displayed within the cards. It is then not necessary for the text on the cards 50 to be displayed sufficiently large to be legible. The text can also be completely omitted.

If one of the cards 50 is now selected, it is automatically placed within the signaling sequence after the selected card 47*b*. As soon as a new card is placed in the signaling sequence, the checking device 22 checks whether a signaling sequence permitted within the protocol has been selected in this manner. The result of this check is displayed after the placing of the card 50 on the display unit 11.

Similarly, it is recognisable here that an accurate signaling procedure of the cards 47*b* is displayed in the third window 33*b*. As soon as the card 47*b* is activated, the exact content of the signaling can be displayed through a further user selection. If individual messages are now selected within this signaling between the device under test and the network, the sequence of the signaling within the selected card can be modified by means of the card-modification device 21 from FIG. 2.

Figure 5:
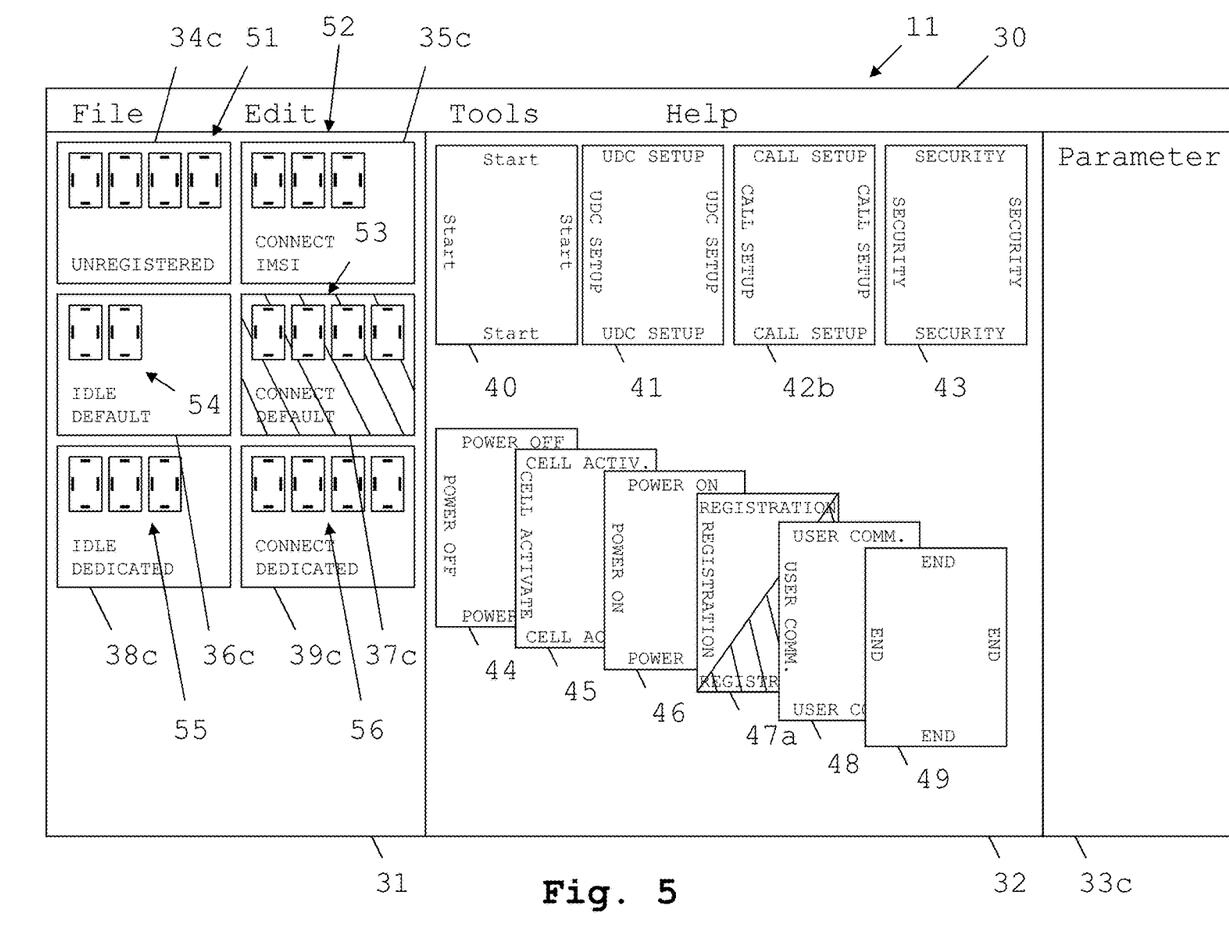
FIG. 5 a third view of the display unit of the embodiment of the testing device.

FIG. 5 shows a further view of the display unit 11 from the embodiment of the testing device. Here, for all protocol statuses 34c, 35c, 36c, 37c, 38c and 39c, the cards are displayed which take the device under test out of the respective status, respectively retain the status. This view is selected in order to specify an original sequence of the cards. Accordingly, the cards can be collated one after another to form a signaling sequence.

Alongside a transition between different protocol statuses within a completed protocol, protocol statuses within different protocols can also be observed. This is relevant, for example, if a transfer of a connection of the device under test from a GSM base station to a UMTS base station is to be tested. In this case, the statuses of the device under test in both protocols are displayed side-by-side within the first window 31. That is, the device under test can then provide a protocol status within the GSM protocol and a separate protocol status within the UMTS protocol. One card can then simultaneously trigger a status transition within both protocols. This is then displayed accordingly on the card. For example, the card is then divided into four regions of different colors, which display the starting statuses and the destination statuses in both protocols.

Figure 6A:
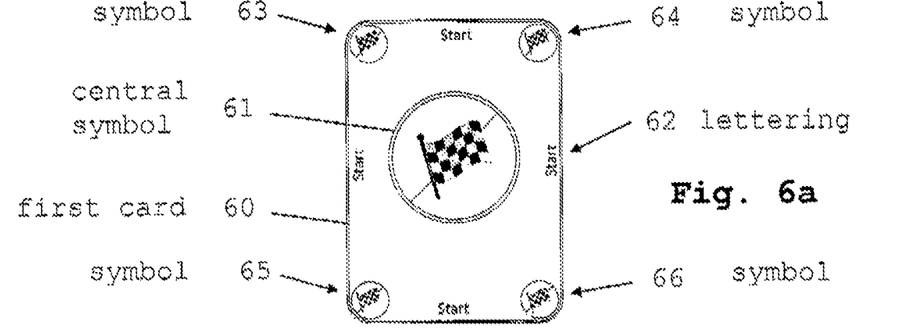
FIG. 6a a detail view of a first card for use by the embodiment of the testing device.

FIG. 6a shows a first card 60 to be displayed by the embodiment of the device. The card 60 provides a symbol 61 in the centre divided in two. Furthermore, it provides a lettering 62 on its four sides. Furthermore, the symbol 61 is again displayed as symbols 63-66 in the four corners of the card 60. The division into two of the symbols 61-66 here shows the status transition which is triggered by the card. However, the card 60 does not perform any status transition. That is, both sides of the symbols 61, 63-66 are white.

Figure 6B:
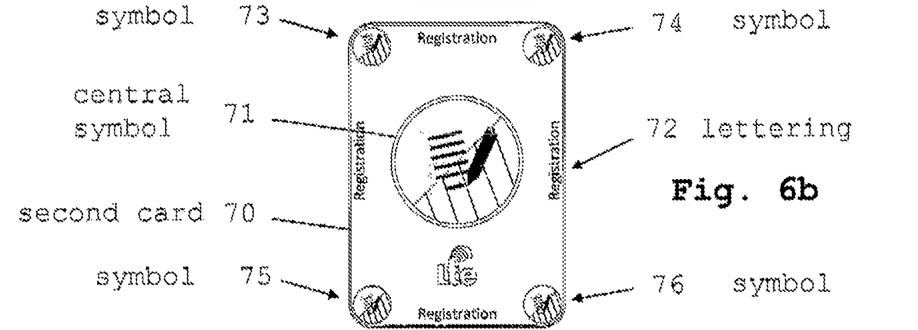
FIG. 6b a detail view of a second card for use by the embodiment of the testing device.

FIG. 6b shows a second card 70. This card 70 serves for the registration of a mobile-radio device in the network. Here also, the card 70 provides a lettering 72 on its four sides, a central symbol 71 divided into two and a repetition of the symbol 71 in the four corners as symbols 73-76. In this context, the symbol 71 divided into two shows that the card 70 leads from any arbitrary status to a given status shown by the hatching in the bottom right part of the symbol 71. Accordingly, the card 70 can be arranged after any arbitrary card. However, only cards which show no hatching or the identical hatching as the symbol 71 of the card 70 can be arranged after the card 70.

Figure 6C:
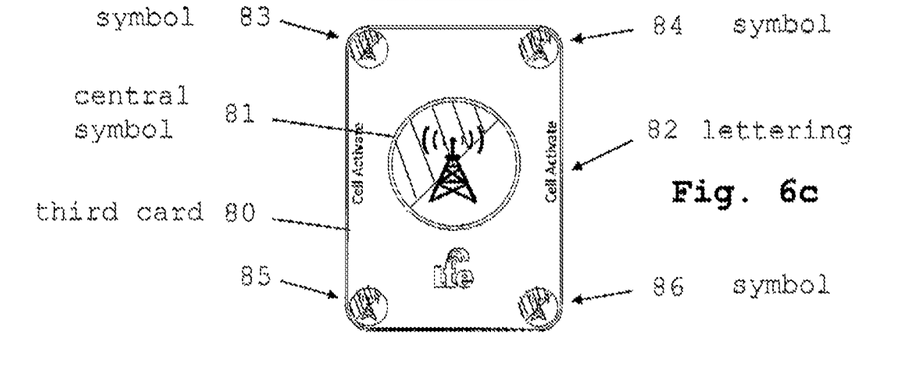
FIG. 6c a detail view of a third card for use by the embodiment of the testing device.

Such a card is illustrated in FIG. 6c. The card 80 again provides a central symbol 81 divided into two and repetitions of this central symbol in the four corners as symbols 83 to 86. Additionally, it provides a lettering 82 on its four sides. This card 80 serves for the activation of the base station. The hatching of the central symbol 81 in this context indicates that the card 80 can only be placed after cards without hatching respectively with identical hatching. Furthermore, the white, bottom right part of the central symbol 81 indicates that any arbitrary other card can be arranged after this card 80.

Alongside a display by means of hatchings, as shown in FIGS. 6a-6c, a color display or a display in the form of different patterns can be selected. Furthermore, the display need not be implemented in the form of a central symbol and four smaller repetitions in the corners of the card. Accordingly, it is conceivable to use the entire card for the display of the status transition which is triggered by the card. For this purpose, it is conceivable, for example, to halve the entire card and to display the original status in the first half and the destination status in the second half. Furthermore, a color progression from the first half to the second half of the card is conceivable in this manner. Similarly, a pattern progression along the length or width of the card or diagonally is also conceivable. Furthermore, a brief summary of the signaling contained can also be shown, for example, on the card.

Figure 7:
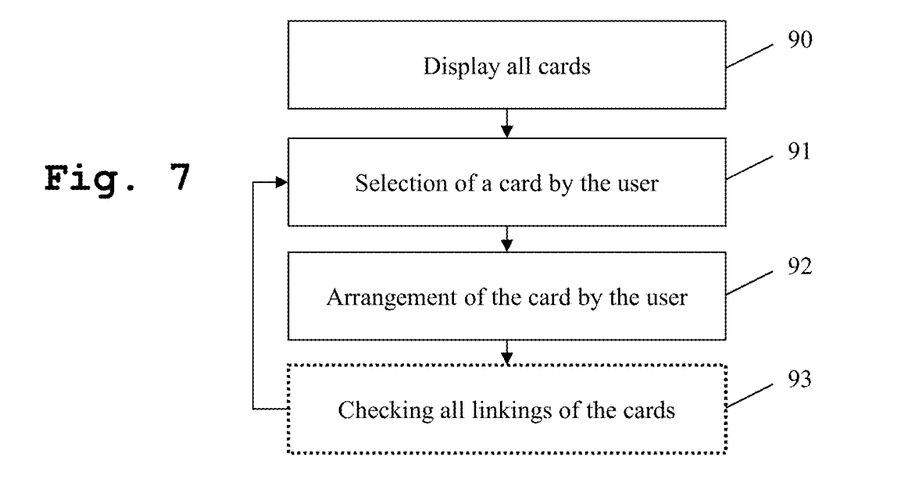
FIG. 7 a first embodiment of the method.

FIG. 7 shows a flow diagram of a first embodiment of the method. In a first step 90, all possible cards within the present protocol are displayed. This corresponds to the display from FIG. 5. In a second step 91, a selection of one of the displayed cards is made by the user.

After the selection of one of the cards by the user, the arrangement of this selected card is again made by the user in a third step 92. Optionally, a check is then carried out regarding whether the sequence of the arrangement of the cards is permitted within the present protocol. This takes place in a fourth step 93. However, this step is optional. After the optional step 93 respectively after the step 92, the second step 91 is again continued, until the user has arranged so many cards as she/he needs for the signaling sequence. As described above, in this context, each card corresponds to one signaling portion.

Figure 8:
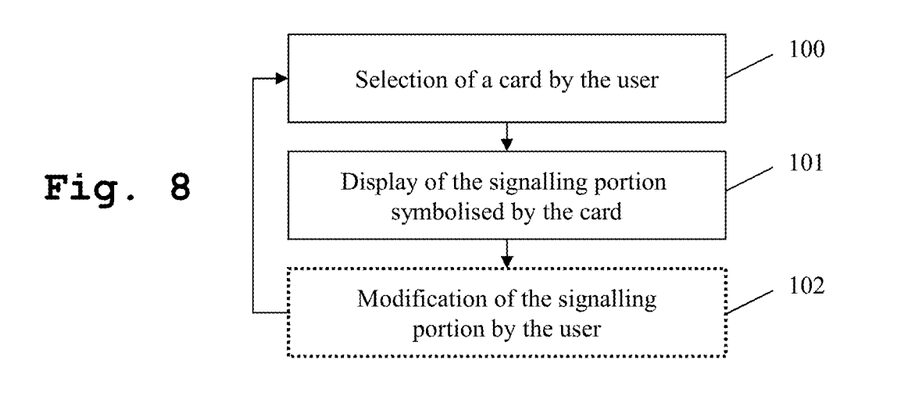
FIG. 8 a second embodiment of the method.

FIG. 8 shows a flow diagram of a second embodiment of the method. In a first step 100, a selection of a card is made by the user. These cards relate to cards already arranged in the signaling sequence. In a second step 101, the signaling portion symbolised by this card is displayed. This corresponds to the view from FIG. 4. In a third step 102, which is again optional, the user can modify the signaling of this signaling portion. This can be implemented by changing individual messages, by adding or removing messages. After the optional step 102 respectively after the step 101, the first step 100 is continued, until the user selects no further cards.

Figure 9:
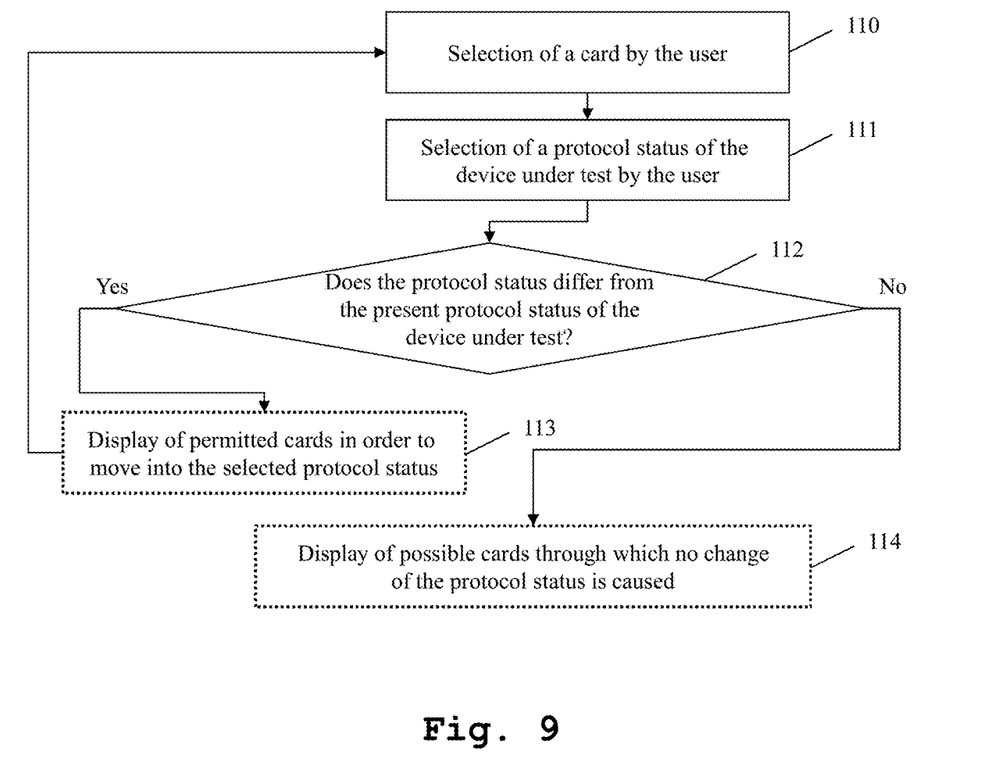
FIG. 9 a third embodiment of the method.

In FIG. 9, a flow diagram of a third embodiment of the method is shown. In a first step 110, a card is initially selected within the already prepared signaling. Here also, the selection is again made by the user, for example, by means of an operating unit 15, as illustrated in FIG. 1. This can be, for example, a mouse or a touch-sensitive screen.

In a second step 111, the user selects a desired protocol status of the device under test. In a third step 112, it is determined whether the desired protocol status differs from the present protocol status of the device under test in the planned test procedure. If no measurement is currently implemented, but only a signaling procedure is prepared, the present protocol status of the device under test corresponds to the protocol status of the device under test triggered by the card selected. If the desired protocol status differs from the present protocol status, all permitted cards which lead to the desired protocol status are displayed. This takes place in a fourth step 113. If only one step, that is, one card is necessary in this context, only such cards are displayed. However, if several cards are necessary in succession in order to achieve the desired protocol status, strings of cards are also displayed.

However, if it is determined in the third step 112 that the present protocol status already corresponds to the desired protocol status, all possible cards which cause no change of the protocol status are displayed. Here also, the steps 110 to 114 are repeated until the user selects no further card.

The invention is not restricted to the embodiments displayed. As already mentioned, arbitrary protocols can be processed. signaling between more than two terminal devices can also be processed. All of the features described or claimed above or features shown in the drawings can be combined with one another arbitrarily within the scope of the invention.

The invention claimed is:

1. A testing device for testing a device under test with a control unit, a display unit and an operating unit,
wherein the control unit is embodied to implement a mutual signaling comprising signaling portions with the device under test,
wherein the control unit provides a card-generating device for generating cards for display by means of the display unit, wherein the cards each correspond to a given signaling portion, and
wherein the card-generating device is embodied to display the cards in such a manner on the display unit that linking possibilities of the cards are marked, or
wherein linking possibilities of the cards are marked by means of colored areas and/or shaded areas and/or symbols.

2. The testing devices according to claim 1,
wherein, prompted by a user entry by means of the operating unit, the card-generating device is embodied to place the cards in a sequence specified by a user on the display unit and, in this manner, to specify a sequence of the signaling portions of the signaling to be implemented.

3. The testing device according to claim 1,
wherein the linking possibilities of the cards correspond to permitted signaling sequences within a communications protocol.

4. The testing device according to claim 3,
wherein the control unit further contains a checking device, which is embodied to check whether linkings of cards specified by the user which correspond to series of signaling portions are permitted according to the communications protocol, and to display this by means of the display unit.

5. The testing device according to claim 1,
wherein the control unit further contains a card-modification device, and
wherein, prompted by a user entry, by means of the operating unit, the card-modification device is embodied to modify the signaling portions of the cards.

6. The testing device according to claim 1,
wherein the control unit further provides a status-monitoring device, which is embodied to monitor and display on the display unit a planned protocol status of the device under test during a specification of the linking of the cards and/or to monitor and display on the display unit a protocol status of the device under test during an implementation of measurements.

7. The testing device according to claim 6,
wherein the control unit further provides a transition device, which, in the case of a selection of a given protocol status, is embodied to display by means of the display unit cards which correspond to signaling portions which transfer the device under test from a protocol status present within the signaling to be implemented into the given protocol status.

8. The testing device according claim 6,
wherein the transition device is embodied to display by means of the display unit individual cards which correspond to signaling portions which transfer the device under test from the present protocol status directly to the given protocol status when a direct transfer is permitted according to the communications protocol, and/or to display by means of the display unit series of cards which correspond to signaling portions which transfer the device under test from the present protocol status via at least one intermediate status to the given protocol status when a direct transfer is not permitted according to the communications protocol.

9. A method for testing a device under test,
wherein a mutual signaling comprising signaling portions is implemented with the device under test,
wherein cards are generated automatically for display on a display unit, wherein the cards each correspond to a given signaling portion, and
wherein the cards are displayed in such a manner that linking possibilities of the cards are marked, or
that linking possibilities of the cards are marked by means of colored areas and/or shaded areas and/or symbols.

10. The method according to claim 9,
wherein prompted by a user entry, the cards are placed in a sequence specified by a user, and a sequence of the signaling portions of the signaling to be implemented is specified in this manner.

11. The method according to claim 9,
wherein the linking possibilities of the cards correspond to permitted signaling sequences within a communications protocol.

12. The method according to claim 11,
wherein it is checked, whether linkings of cards specified by the user which correspond to series of signaling portions are permitted according to the communications protocol, and that a result of this check is displayed.

13. The method according to claim 9,
wherein, prompted by a user entry, the signaling portions of the cards are modified.

14. The method according to claim 9,
wherein a planned protocol status of the device under test is monitored and displayed during a specification of the linking of the cards, and/or
wherein a protocol status of the device under test is monitored and displayed during an implementation of measurements.

15. The method according to claim 14,
wherein, in the case of a selection of a given protocol status, cards are displayed, which correspond to signaling portions, which transfer the device under test from a protocol status present within the signaling to be implemented into the given protocol status.

16. The method according to claim 14,
wherein individual cards are displayed which correspond to signaling portions which transfer the device under test from the present protocol status directly to the given protocol status when a direct transfer is permitted according to the communications protocol, and/or
wherein series of cards are displayed which correspond to signaling portions which transfer the device under test from the present protocol status via at least one intermediate status to the given protocol status when a direct transfer according to the communications protocol is not permitted.

17. A non-transitory computer-readable storage medium carrying one or more sequences of one or more instructions which, when executed by one or more processors, cause an apparatus to at least perform the following steps:
wherein a mutual signaling comprising signaling portions is implemented with the device under test,
wherein cards are generated automatically for display on a display unit, wherein the cards each correspond to a given signaling portion, and
wherein the cards are displayed in such a manner that linking possibilities of the cards are marked, or that linking possibilities of the cards are marked by means of colored areas and/or shaded areas and/or symbols.

\* \* \* \* \*